Jan. 9, 1951 M. C. NOTTINGHAM 2,537,232
MEANS FOR CONNECTING A DISPOSAL AND A SEWER LINE
Filed Dec. 2, 1946
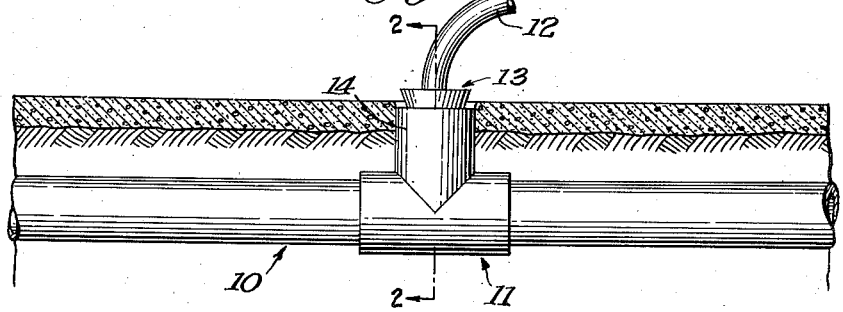
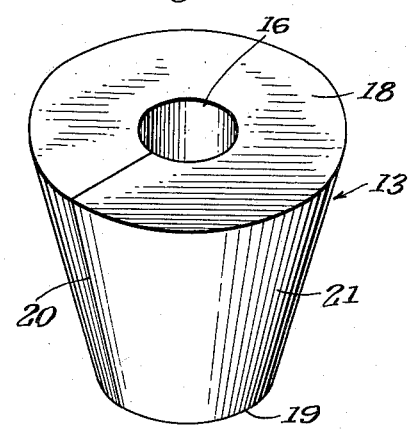
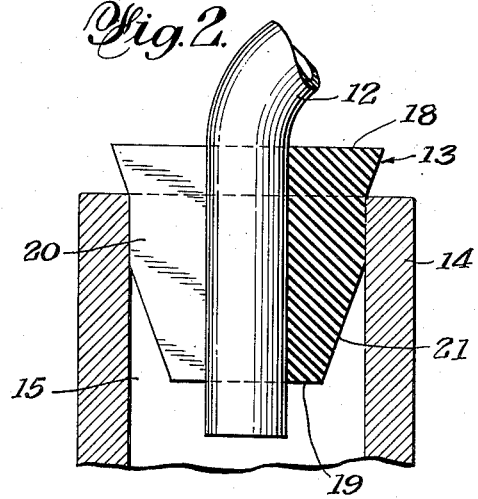
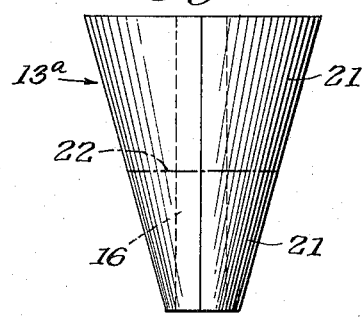
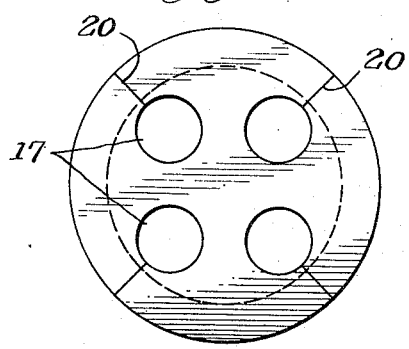
INVENTOR.
M. C. Nottingham
BY C. J. Stratton
ATTORNEY

Patented Jan. 9, 1951

2,537,232

UNITED STATES PATENT OFFICE 2,537,232

MEANS FOR CONNECTING A DISPOSAL AND A SEWER LINE

Mark C. Nottingham, Arcadia, Calif.

Application December 2, 1946, Serial No. 713,443

3 Claims. (Cl. 182—1)

This invention relates to connection means and more particularly to a connector between a sewer or other disposal line and a trailer or similar vehicle. The invention is primarily intended for use in trailer camps to facilitate connecting vehicles to a sewer line provided.

An object of this invention is to provide simple, effective and improved connection means facilitating quick and easy connection of a vehicle, as indicated, to a sewer line.

Another object of the invention is to provide a simple plug type of connector which, by a simple push, effects firm and safe connection of a hose to a sewer line and which, by a simple pull, effects disengagement thereof.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a broken side view of a ground-buried sewer line showing the manner of effecting the connection thereto as contemplated in this invention.

Fig. 2 is an enlarged broken sectional view as taken on the line 2—2 of Fig. 1.

Fig. 3 is a perspective view of a plug connector employed in the invention.

Fig. 4 is a side view of a plug formed to provide two plug connectors of different size.

Fig. 5 is a top plan view of a plural plug connector.

As illustrated in the drawing, the invention comprises, generally, a sewer line 10 which throughout its length is provided with a suitable number of spaced connection fittings 11, flexible disposal lines or hose 12 carried by vehicles of the trailer type and comprising the disposal means for said vehicles, and a plug connector 13 for effecting connection of a hose 12 to one of the fittings 11.

The sewer line 10 is generally conventional and is made up of soil pipe typically buried in the ground, as shown. The ground may be paved or not, as desired.

At suitable intervals along the length of the sewer line and according to the general layout of the trailer camp, are provided the fittings 11. The latter may vary in form. As shown, each fitting comprises a T so arranged that the leg 14 thereof extends upwardly through the ground. The length of the leg 14 may vary according to the depth of the sewer line below the ground. Should this depth be unusually large, the leg 14 may have an extension nipple terminating at or adjacent to the ground line. The leg 14 or an extension thereof is formed as a tubular member having a passage 15 communicating with the sewer line 10.

The line or hose 12 may also vary. Conventionally, however, it comprises a pliable hose of suitable size to pass sewage or the like.

The plug connector is formed of a compressible material such as natural or synthetic rubber. As shown in Figs. 1, 2 and 3, said connector is formed as a conical plug having a central passage 16 or, as shown in Fig. 5, several passages 17, extending through between the larger and smaller circular faces 18 and 19, respectively, of the plug. A slit 20 extends through the plug from the passage 16 or the passages 17 to the conical face 21 of the plug.

In practice, as seen in Fig. 4, an elongated plug 13a is made up. By dividing said plug along a transverse line 22, two plugs 13 are formed, one smaller than the other to fit passages 15 of different size.

In use, the end of a hose 12 is introduced into the passage 16 of a plug connector 13, said hose entering from the larger face of the connector and preferably extending through and beyond the smaller face thereof. Then by inserting said smaller end of the connector 13 into the passage 15, the conical wall of said connector will engage the wall of passage 15 to be compressed, as shown, and thereby both firmly grip the hose 12 and tightly close the slit 20. The foregoing is readily effected because of the pliability and compressibility of the plug connector. A firm, tight and odorless connection is thus readily effected and will be maintained until the plug connector is upwardly pulled to dislodge it from the extension 14.

When the form shown in Fig. 5 is used and less connections are made than are provided for by the connector, one or more of the passages 17 may be plugged by suitable cylindrical members.

While I have illustrated and described what I now regard as the preferred embodiments of my invention, the constructions are, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. A connector for the disposal hose of a trailer or the like and a sewer line having an outwardly directed tubular connection, comprising a conical plug of compressible material having a passage receptive of said hose and a slit connecting the passage and the conical face of the plug, the plug being expandable by separation at the slit to facilitate entering the hose into said passage and said conical face being compressible into said tubular connection to effect tight closure of the slit and also tight gripping of the hose.

2. A connector for the disposal hoses of trailers or the like and a sewer line having at least one outwardly directed tubular connection, comprising a conical plug of compressible material having a plurality of passages receptive of said hoses and a slit connecting each passage and the conical face of the plug, the plug being expandable by separation at the slits to facilitate entering the hoses into said passages and said conical face being compressible into said tubular connection to effect tight closure of the slits and also tight gripping of the hoses.

3. As a new article of manufacture, an element for connecting the disposal hose of a trailer and a sewer line, said element comprising a conical connector formed of compressible material and having at least one passage extending therethrough between the end faces of the connector and also having a slit extending between said passage and the conical face of the connector and longitudinally coextensive with said passage, said connector being of such length it is adapted to be transversely cut at least once to divide the same into smaller and larger connectors to fit a variety of sizes of sewer line.

MARK C. NOTTINGHAM.

REFERENCES CITED

The following references are of record in the file of this patent:

UNITED STATES PATENTS

| Number | Name | Date |
|---|---|---|
| 810,879 | Perry | Jan. 23, 1906 |
| 837,408 | Johnstone | Dec. 4, 1906 |
| 1,205,017 | Rathke | Nov. 14, 1916 |
| 1,392,955 | Martin | Oct. 11, 1921 |
| 2,132,598 | Barton | Oct. 11, 1938 |

FOREIGN PATENTS

| Number | Country | Date |
|---|---|---|
| 23,396 | Great Britain | Oct. 27, 1902 |
| 4,525 | Great Britain | Feb. 21, 1914 |